(12) United States Patent
Sato

(10) Patent No.: US 9,454,334 B2
(45) Date of Patent: Sep. 27, 2016

(54) RECORDING SYSTEM HAVING INFORMATION PROCESSING DEVICE AND PERIPHERAL DEVICES

(71) Applicant: Brother Kogyo Kabushiki Kaisha, Nagoya-shi, Aichi-ken (JP)

(72) Inventor: Hirokazu Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/700,589

(22) Filed: Apr. 30, 2015

(65) Prior Publication Data

US 2015/0317542 A1    Nov. 5, 2015

(30) Foreign Application Priority Data

Apr. 30, 2014    (JP) .................................. 2014-093317

(51) Int. Cl.
*G06F 3/12* (2006.01)
*G06K 15/00* (2006.01)

(52) U.S. Cl.
CPC .............. *G06F 3/12* (2013.01); *G06F 3/1229* (2013.01); *G06F 3/1285* (2013.01); *G06K 15/002* (2013.01)

(58) Field of Classification Search
None
See application file for complete search history.

(56) References Cited

U.S. PATENT DOCUMENTS

| 8,019,853 B2 | 9/2011 | Machida | |
| 2003/0063313 A1* | 4/2003 | Ito | G06F 3/1253 358/1.15 |
| 2005/0055641 A1 | 3/2005 | Machida | |
| 2008/0068649 A1* | 3/2008 | Emori | G06F 3/1204 358/1.15 |
| 2014/0043641 A1* | 2/2014 | Ohara | G06F 3/1204 358/1.13 |

FOREIGN PATENT DOCUMENTS

JP    2000-315182 A    11/2000

* cited by examiner

*Primary Examiner* — Fan Zhang
(74) *Attorney, Agent, or Firm* — Banner & Witcoff, Ltd.

(57) ABSTRACT

A non-transitory computer readable storage medium stores a set of program instructions executed by an information processing device. The program instructions, when executed by the information processing device, causes the information processing device to perform a data listing to display a list of first identifiers and second identifiers on the display unit in a manner selectable through the operation unit, when the operation unit receives a user's operation to select a combination of a first device and a second device among the plurality of devices. The program instructions include transmitting a first recording instruction information to the second device via the communication unit when the operation unit receives a user's operation to select one first identifier. The program instructions include transmitting a second recording instruction information to the second device via the communication unit when the operation unit receives a user's operation to select one second identifier.

16 Claims, 9 Drawing Sheets

RECORDING SYSTEM HAVING INFORMATION PROCESSING DEVICE AND PERIPHERAL DEVICES

CROSS REFERENCE TO RELATED APPLICATION

This application claims priority from Japanese Patent Application No. 2014-093317 filed Apr. 30, 2014. The entire content of the priority application is incorporated herein by reference.

TECHNICAL FIELD

The present invention relates to a system in which an information processing device is capable of instructing another device to perform a recording process.

BACKGROUND

One technology discloses a system in which a plurality of peripheral devices are operated in combination with one another.

SUMMARY

Such a system is conceivable in which data is downloaded from a server device that provides a storage service and an image recording device is instructed to perform a recording process on the downloaded data for recording an image represented by the data on a recording medium.

However, many server devices can also store data of which data formats are not supported by the image recording device. Therefore, in a case where the server device and the image recording device cooperate with each other in the conceivable system, it is necessary to allow only the data in a format (for example, a JPEG format) supported by the image recording device to be downloaded from the server device. As a result, data that can be recorded by the image recording device is limited to a very small part of a large variety of data stored in the server device.

One object of the present invention is to provide a system in which an information processing device is capable of instructing a device to perform a recording process on data in various formats stored in another device.

Another object of the present invention is to provide a non-transitory computer readable storage medium storing program instructions that can be installed in an information processing device and that enables the information processing device to instruct a device to perform a recording process on data in various formats stored in another device.

According to one aspect, a non-transitory computer readable storage medium stores a set of program instructions executed by an information processing device. The information processing device includes a display unit, an operation unit, and a communication unit. The display unit is configured to display information. The operation unit is configured to receive a user's operation. The communication unit is configured to communicate with a plurality of devices. The plurality of devices includes a first device and a second device. The first device is configured to store data in a plurality of different formats including data in a first format and data in a second format that is convertible to the first format. Each first identifier identifies data in the first format stored in the first device and each second identifier identifies data in the second format stored in the first device. The second device is configured to record an image indicated by data in the first format on a recording medium. The program instructions, when executed by the information processing device, cause the information processing device to perform a data listing. The data listing displays a list of first identifiers and second identifiers on the display unit in a manner selectable through the operation unit, when the operation unit receives a user's operation to select a combination of the first device and the second device. The program instructions, when executed by the information processing device, cause the information processing device to perform transmitting a first recording instruction information to the second device via the communication unit when the operation unit receives a user's operation to select one first identifier. The first recording instruction information instructs the second device to receive data in the first format identified by the selected first identifier and record an image indicated by the received data. The program instructions, when executed by the information processing device, also causes the information processing device to perform transmitting a second recording instruction information to the second device via the communication unit when the operation unit receives a user's operation to select one second identifier, the second recording instruction information instructing the second device to record an image indicated by data identified by the selected second identifier such that the second device records the image indicated by format-converted data that is obtained by converting the data identified by the selected second identifier from the second format to the first format.

According to another aspect, a recording system includes an information processing device and a plurality of devices. The information processing device includes: a display unit configured to display information; an operation unit configured to receive a user's operation; a communication unit configured to communicate with the plurality of devices; and a control unit. The control unit is configured to perform a data listing to display a list of first identifiers and second identifiers on the display unit in a manner selectable through the operation unit, when the operation unit receives a user's operation to select a combination of a first device and a second device among the plurality of devices. The first device is configured to store data in a plurality of different formats including data in a first format and data in a second format that is convertible to the first format. Each first identifier identifies data in the first format stored in the first device and each second identifier identifies data in the second format stored in the second device. The second device is configured to record an image indicated by data in the first format on a recording medium. The control unit is configured to transmit a first recording instruction information to the second device via the communication unit when the operation unit receives a user's operation to select one first identifier. The first recording instruction information instructs the second device to receive data in the first format identified by the selected first identifier and record an image indicated by the received data. The control unit is also configured to transmit a second recording instruction information to the second device via the communication unit when the operation unit receives a user's operation to select one second identifier. The second recording instruction information instructs the second device to record an image indicated by data identified by the selected second identifier such that the second device records the image indicated by the format-converted data that is obtained by converting the data identified by the selected second identifier from the second format to the first format

BRIEF DESCRIPTION OF THE DRAWINGS

The particular features and advantages of the disclosure will become apparent from the following description taken in connection with the accompanying drawings, in which.

DETAILED DESCRIPTION

Figure 1:
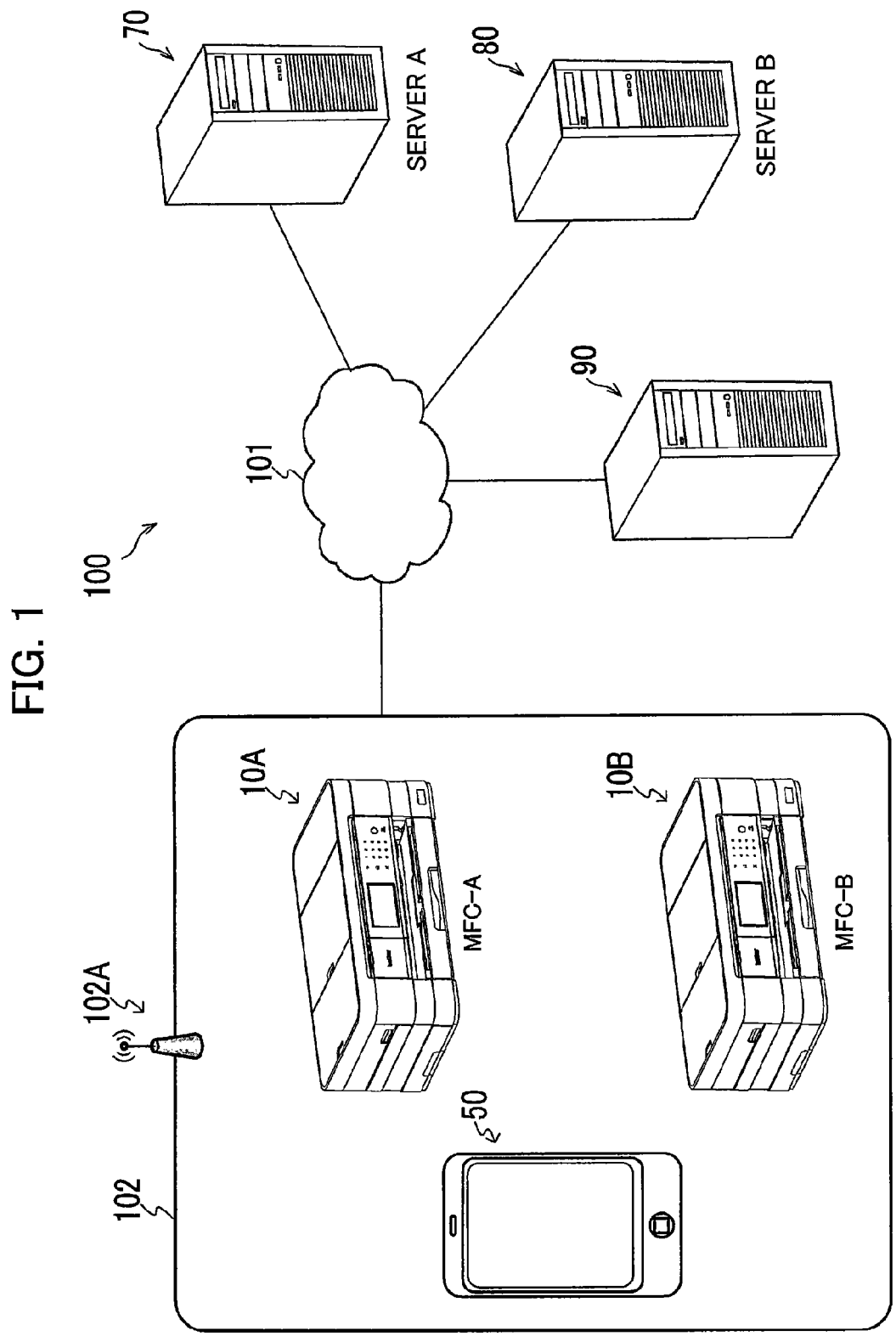
FIG. 1 is a schematic diagram of a recording system according to an embodiment.

A recording system according to a first embodiment will be described while referring to the accompanying drawings wherein like parts and components are designated by the same reference numerals to avoid duplicating description.

FIG. 1 is a schematic diagram illustrating the recording system 100 according to an embodiment. The recording system 100 includes a mobile terminal 50 and peripheral devices. Specifically, the recording system 100 includes the mobile terminal 50, multifunction devices 10A and 10B (hereinafter, sometimes, collectively referred to as "multifunction devices 10"), and server devices 70, 80, and 90. The multifunction devices 10A and 10B, the mobile terminal 50, and the server devices 70, 80, and 90 can communicate with each other via a communication network. Examples of the communication network include the Internet 101, a wired LAN (Local Area Network), a wireless LAN 102, and a combination thereof. However, the communication network is not limited to the above-listed examples.

In the example of FIG. 1 the server devices 70, 80, and 90 are connected to the Internet 101. The wireless LAN 102 is connected to the Internet 101 through a router (not illustrated). The multifunction devices 10A and 10B and the mobile terminal 50 belong to the wireless LAN 102. In other words, each of the multifunction devices 10A and 10B and the mobile terminal 50 is set up for belonging to the wireless LAN 102 and is capable of communicating with another device included in the wireless LAN 102. More specifically, an SSID (Service Set Identifier) the same as that of an access point 102A of the wireless LAN 102 is set to the multifunction devices 10A and 10B and the mobile terminal 50, and a network address the same as that allocated to the wireless LAN 102 is given to the multifunction devices 10A and 10B and the mobile terminal 50, wherein "the network address" is an address specified by a subnet mask within an IP address.

The mobile terminal 50 belonging to the wireless LAN 102 can communicate through the access point 102A with the multifunction devices 10A and 10B, which also belong to the wireless LAN 102. The mobile terminal 50 can also wirelessly communicate with the server devices 70, 80, and 90 through the access point 102A, the router (not illustrated) and the Internet 101. Examples of the wireless communication between the mobile terminal 50 and another communication device through the access point 102A is not limited to a case where the communication is wirelessly performed over the entire length of the communication path between the mobile terminal 50 and the other communicating device. It can be said that the mobile terminal 50 wirelessly transmits and receives information or data to and from another device through the access point 102A when at least the communication path between the mobile terminal 50 and the access point 102A is wireless. It can also be said that the multifunction devices 10 wirelessly transmits and receives information or data to and from another device through the access point 102A when at least the communication path between the multifunction devices 10 and the access point 102A is wireless.

[Multifunctional Device 10]

Figure 2A:
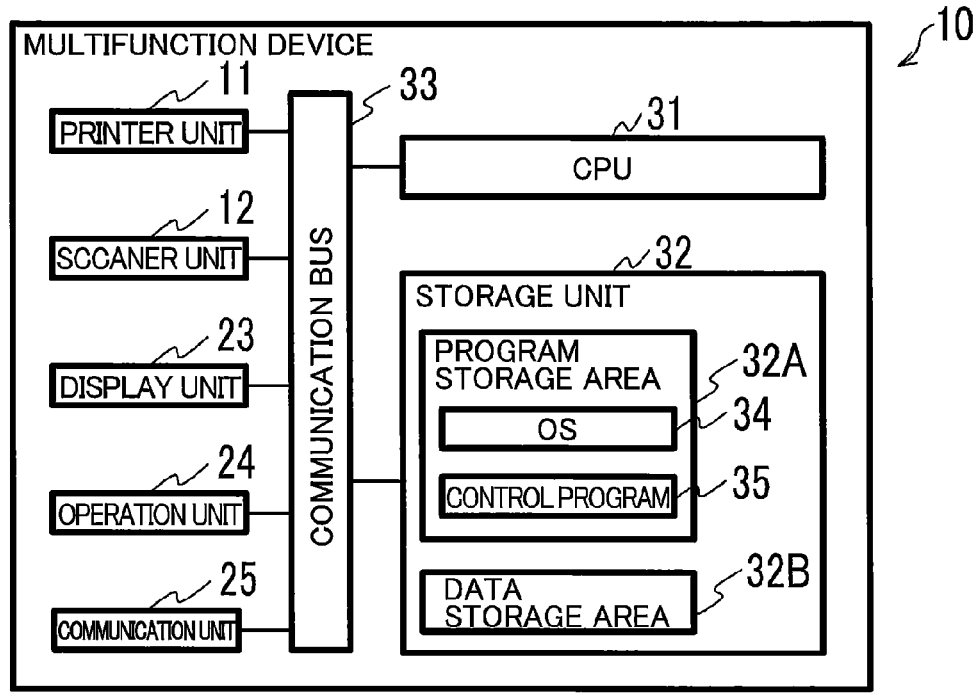
FIG. 2A is a block diagram of a multifunction device in the recording system according to the embodiment.

As illustrated in FIG. 2A, the multifunction device 10 mainly includes a printer unit 11, a scanner unit 12, a display unit 23, an operation unit 24, a communication unit 25, a CPU 31, a storage unit 32, and a communication bus 33. The components constituting the multifunction device 10 are connected to one another via the communication bus 33. The multifunction device 10 is an example of a second device and a recording device. As illustrated in FIG. 1, the device name of the multifunction device 10A is "MFC-A", and the device name of the multifunction device 10B is "MFC-B". The device names are examples of second device identifiers and recording-device identifiers identifying the multifunction devices 10A and 10B. Examples of the second device identifier are not limited to the device name, but further include location information representing locations of the multifunction devices 10A and 10B.

[Printer Unit 11 and Scanner Unit 12]

The printer unit 11 performs a recording process for recording an image represented by first-format data on a recording sheet. The recording sheet is an example of a recording medium. Examples of the recording method employed by the printer unit 11 include a well-known method such as an inkjet method and an electrophotographic method, but are not limited to those specific examples. The scanner unit 12 performs a scanning process for reading out an image recorded on a recording sheet to generate image data. The multifunction device 10 may further include: a facsimile function for performing facsimile transmission/reception, and a copying function for reading out an image recorded on the recording sheet and recording the read-out image on another recording sheet.

In the embodiment, the printer unit 11 in the multifunction device 10A can perform a recording process on JPG-format data (JPG: Joint Photographic Experts Group), while the printer unit 11 of the multifunction device 10B can perform a recording process on BMP (Bitmap)-format data. Namely, the multifunction devices 10 are different from one another in data formats on which the multifunction devices 10 can perform the recording process. That is, data formats compatible with the recording process varies among the multifunction devices 10A and 10B. The JPG format is an example of a fifth format, and the BMP format is an example of a sixth format. In addition, the fifth format and the sixth format are collectively referred to as a first format. In other words, the first format can be classified into the fifth and sixth formats. It will be appreciated that the examples of the first format, the fifth format, and the sixth format are not limited to the above-described specific examples.

[Display Unit 23]

The display unit 23 includes a display screen for displaying various kinds of information. Examples of the display unit 23 include an LCD (Liquid Crystal Display) and an OELD (Organic Electro-Luminescence Display), but are not limited to the specific examples.

[Operation Unit 24]

The operation unit 24 receives a user's operation for selecting an object displayed on the display screen of the display unit 23. More specifically, the operation unit 24 includes push buttons, for example, and outputs to the CPU 31 various operation signals in correspondence with the user's pushed buttons. The operation unit 24 may include a membrane-shaped touch sensor over the display screen of the display unit 23. Namely, the display unit 23 may also serve as a touch panel display. The touch sensor may be of a well-known type such as a capacitive type or a resistive film type.

In the description, an "object" denotes an image which is selectable by the user's operation on the operation unit 24. One example of an object is an array of characters displayed on the display unit 23. One of the objects may be highlighted by pushing a direction key in the operation unit 24. The highlighted object is selected by pushing a decision button in the operation unit 24. In a case where the operation unit 24 is a touch panel, the objects may be icons, buttons, or links displayed on the display unit 23. One of the objects that is displayed at a user's touched position is selected.

[Communication Unit 25]

The communication unit 25 is an interface for wirelessly communicating with an external device. More specifically, the communication unit 25 can wirelessly communicate with the mobile terminal 50 through the access point 102A using an indirect wireless communication system. The communication unit 25 can wirelessly communicate with the server devices 70, 80, and 90 through the access point 102A and the router (not illustrated). Examples of the communication procedure employed by the communication unit 25 include Wi-Fi (registered trade mark of Wi-Fi Alliance), but are not limited to the specific example.

[CPU 31]

The CPU (Central Processing Unit) 31 controls overall operations of the multifunction device 10. The CPU 31 acquires various programs (described later) from the storage unit 32 and executes the programs on the basis of various kinds of information that are outputted from the operation unit 24 and that are acquired through the communication unit 25 from the mobile terminal 50 and the server devices 70, 80, and 90. Namely, the CPU 31 and the storage unit 32 are examples of a control unit.

[Storage Unit 32]

The storage unit 32 includes a program storage area 32A and a data storage area 32B. The program storage area 32A stores an OS (Operating System) 34 and a control program 35. The control program 35 may be a single program or a set of plural programs. The data storage area 32B stores data and information required by the CPU 31 perform the control program 35.

In the specification, "data" and "information" have common characteristics in that the data and the information are bits or bit columns which can be processed by a computer. The "data" denotes bits or bit columns that a computer can be process without considering a meaning or content indicated by each bit. On the contrary, operation of a computer varies depending on a meaning or content indicated by each bit contained in the "information". The "instruction" is a control signal for prompting a destination device to perform the next operation. The "instruction" may contain information, or the "instruction" itself may have the same characteristics as information.

Even if formats of the "data" and the "information" (for example, a text format, a binary format, and a flag format) are changed in respective computers, the "data" and the "information" are regarded by the respective computers as the same data and the same information, provided that the "data" and the "information" are recognized by the computers as keeping the same meaning or content. For example, "information" representing "two" is represented by "0x32" in ASCII code in a text format in one computer, but is represented by "10" in binary notation in a binary format in another computer.

However, "data" and "information" are not strictly distinguished from each other, but may be treated in exceptional manners. For example, "data" may be temporarily processed as "information", and "information" may be temporarily processed as "data". In addition, data held in a computer may be processed as "information" in anther computer. "Information" may be extracted from among "data", and "data" may be extracted among "information".

Example of the storage unit 32 include: a RAM (Random Access Memory), a ROM (Read Only Memory), an EEPROM (Electrically Erasable Programmable Read-Only Memory); an HDD (Hard Disk Drive), a buffer in the CPU 31, and a combination of the above-listed devices.

The storage unit 32 may be a computer-readable storage medium. The computer-readable storage medium is a non-transitory medium. Examples of the non-transitory medium include a recording medium such as a CD-ROM and a DVD-ROM as well as the above-described examples of the storage unit 32. The non-transitory medium is also a tangible medium. Electrical signals carrying thereon a program downloaded from a server located on the Internet do not belong to a computer-readable storage medium, although the electrical signal are a computer-readable signal medium which is a kind of computer-readable medium.

The programs stored in the program storage area 32A are executed by the CPU 31.

The OS 34 is a basic program providing API (Application Programming Interface) for controlling the printer unit 11, the scanner unit 12, the display unit 23, the operation unit 24, and the communication unit 25 which are hardware components constituting the multifunction device 10. When executing the control program 35, the CPU 31 controls the hardware components by calling the API provided by the OS 34.

[Mobile Terminal 50]

Figure 2B:
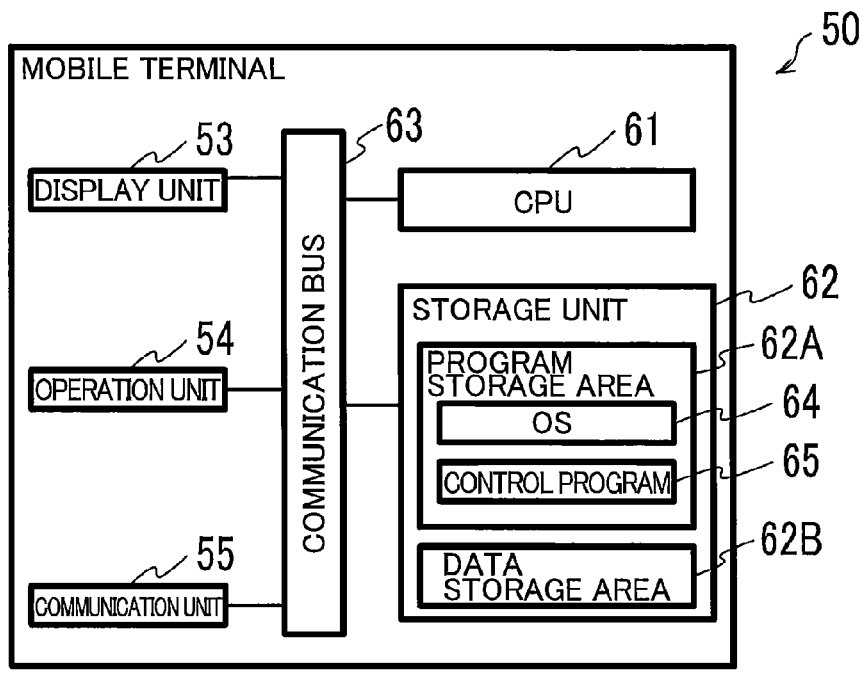
FIG. 2B is a block diagram of a mobile terminal in the recording system according to the embodiment.

As illustrated in FIG. 2B, the mobile terminal 50 mainly includes a display unit 53, an operation unit 54, a communication unit 55, a CPU 61, a storage unit 62, and a communication bus 63. The display unit 53, the operation unit 54, the communication unit 55, the CPU 61, the storage unit 62, and the communication bus 63 included in the mobile terminal 50 are the same as the display unit 23, the operation unit 24, the communication unit 25, the CPU 31, the storage unit 32, and the communication bus 33 included in the multifunction device 10, respectively. Therefore, explanation of these devises and units will be omitted.

The storage unit 62 has a program storage area 62A and a data storage area 62B. The program storage area 62A of the storage unit 62 stores an OS 64 and a control program 65. When executing the control program 65, the CPU 61 controls the hardware components by calling the API provided by the OS 64. The communication unit 55 can wirelessly communicate with the multifunction devices 10A and 10B and the server devices 70, 80, and 90 through the wireless LAN 102. Example of the mobile terminal 50 includes a smart phone, a mobile phone, and a tablet terminal. The mobile terminal 50 is an example of the information processing device. It is noted, however, that examples of the information processing device are not limited to the mobile terminal 50, but may include a PC (Personal Computer).

Figure 3:
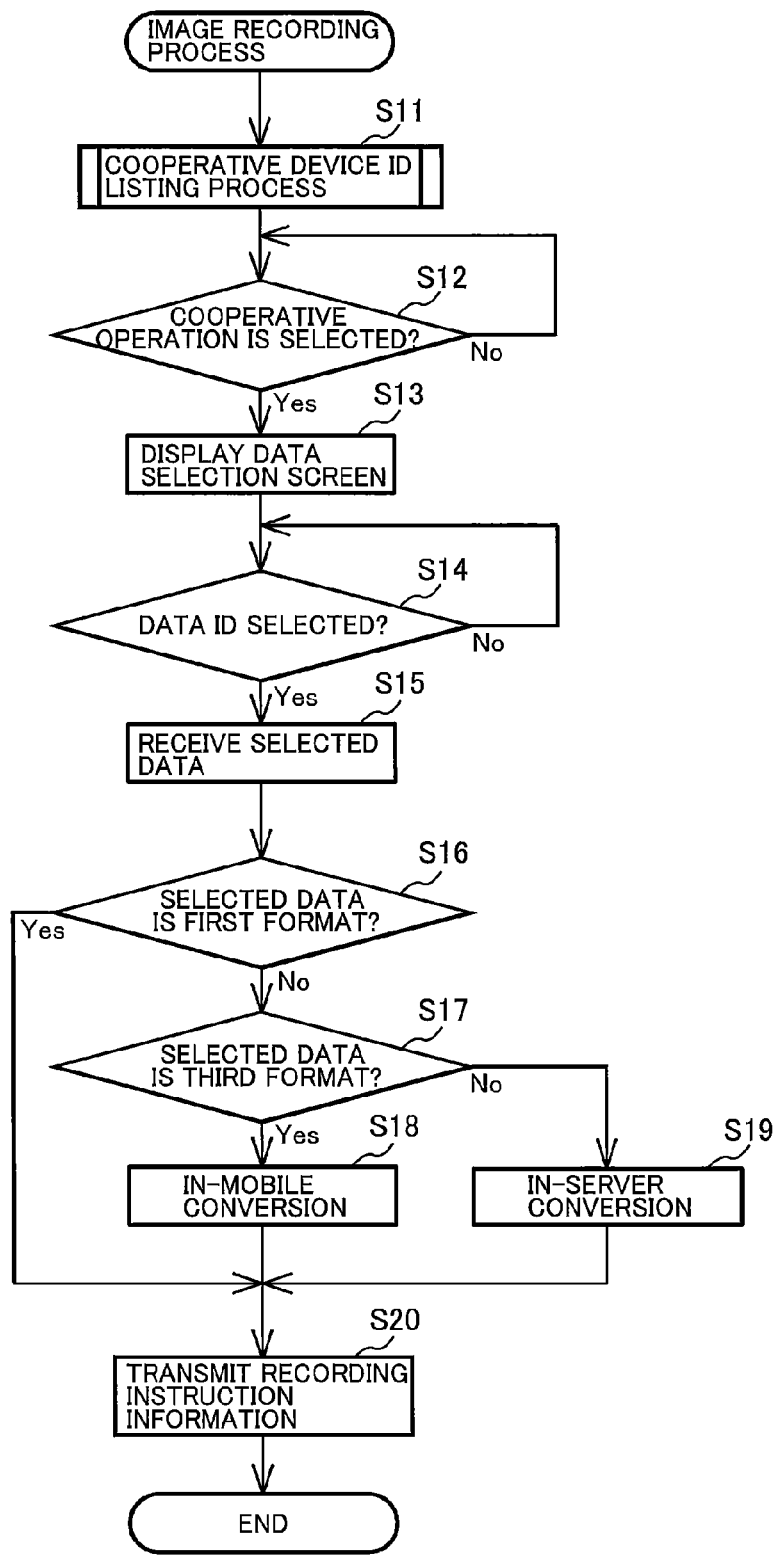
FIG. 3 is a flowchart illustrating steps in an image recording process according to the embodiment.
Figure 4:
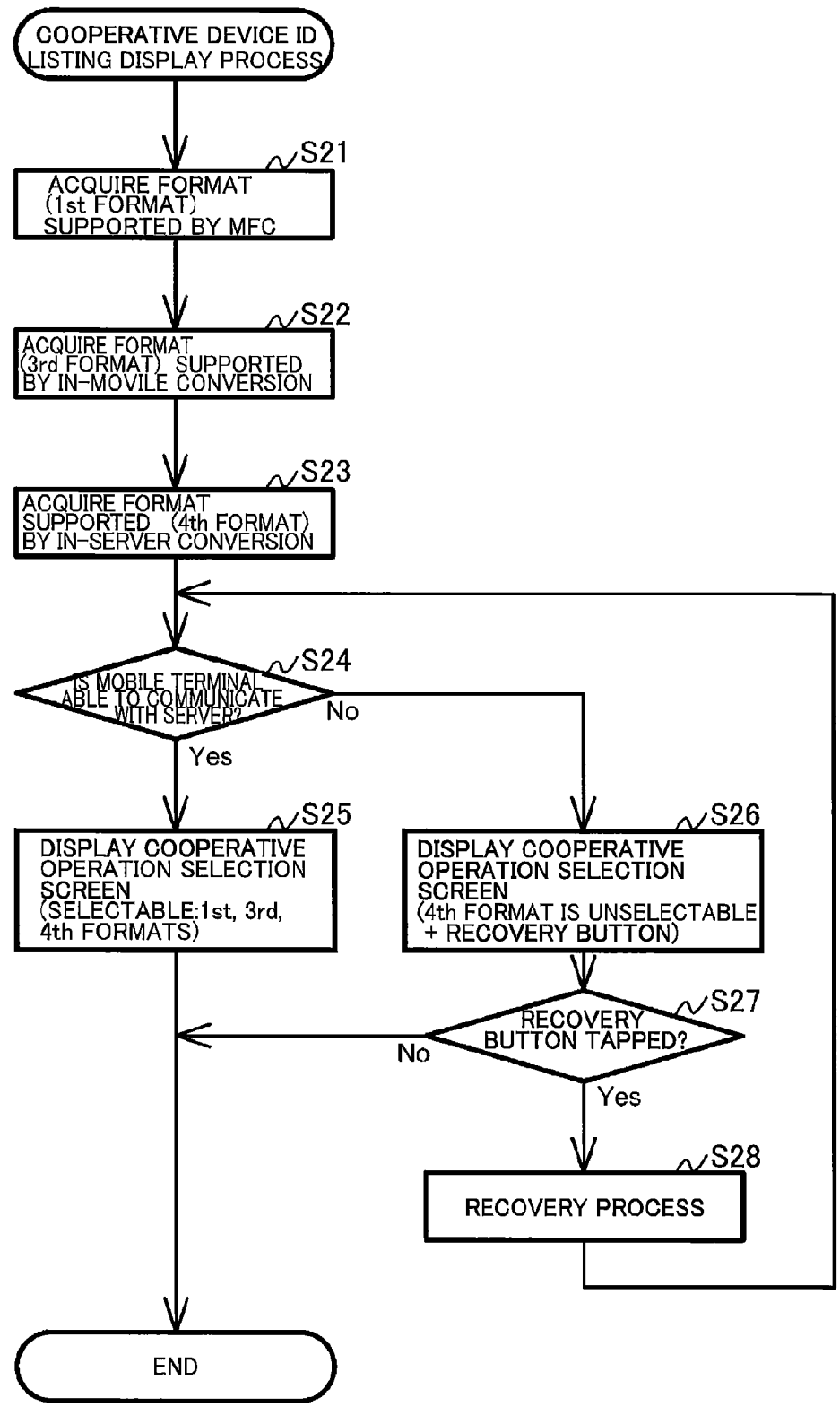
FIG. 4 is a flowchart illustrating steps in a cooperative device ID listing process according to the embodiment.
Figure 5:
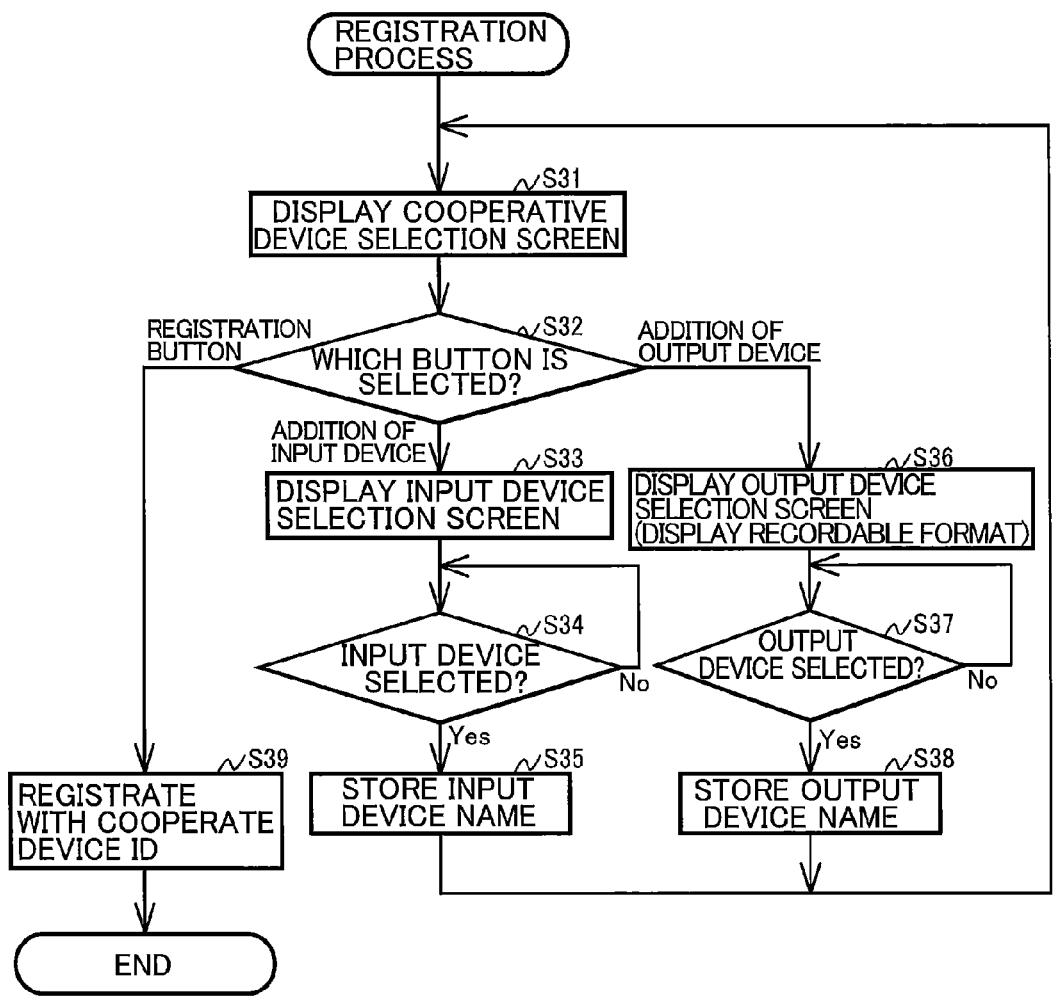
FIG. 5 is a flowchart illustrating steps in a registration process according to the embodiment.

The CPU 61 in the mobile terminal 50 performs processes illustrated in FIGS. 3 to 5 by executing the control program 65. In addition, the CPU 61 performs a conversion process (hereinafter, referred to as "in-mobile conversion") for converting format of data from a third format to the first format by executing the control program 65. Namely, the control program 65 has the function for converting data from the third format to the first format. The control program 65 according to the embodiment can convert PDF-format data (PDF: Portable Document Format) into a JPG format or a BMP format. Incidentally, the data acquired by converting the format of the original data as described above will be referred to as a "converted data" or "format-converted data" hereinafter. The PDF format is an example of the third format. Incidentally, the third format and later-described fourth format are collectively referred to as a second format. In other words, the second format can be classified into the third and fourth formats.

Incidentally, converting format of data is a process of changing, for example, a data structure of target data, without substantially changing an image indicated by the target data. Thus, during the format conversion, an image represented by the target data may be slightly deteriorated or improved in its image quality or color (hereinafter, referred to as "image quality or the like"). The data storage area 62B stores one or more groups of: cooperative ID, a device name of an input device, and a device name of an output device that are registered in a registration process to be described later with reference to FIG. 5.

[Server Devices 70, 80, and 90]

Each of the server devices 70 and 80 stores plural data in a large variety of formats. The server devices 70 and 80 are, for example, storage servers. The server devices 70 and 80 can transmit stored data, data ID of the data, and location information representing location of the data. Examples of the data ID include a file name, but are not limited to the specific example. The data ID is an example of the data identifier. The first identifier and the second identifier. The server devices 70 and 80 are examples of the first device and the storing device. As illustrated in FIG. 1, the device name of the server device 70 is a "server A"; the device name of the server device 80 is a "server B". Examples of the first device identifier are not limited to the device name, but further include location information representing locations of the multifunction devices 10A and 10B. Examples of the location information include URL (Uniform Resource Locator) format information, but are not limited to the URL. The first device identifier and the second device identifier are examples of a storing-device identifier and a recording-device identifier. Namely, the device names are examples of the storing-device identifiers which identify the server devices 70 and 80.

The server device 90 performs a conversion process for converting fourth-format data into the first format (hereinafter, referred to as "in-server conversion"). The server device 90 according to the embodiment converts DXF-format data (DXF: Drawing Exchange Format) into a JPG format or a BMP format. More specifically, when receiving conversion instruction information from the mobile terminal 50, the server device 90 receives DXF-format data from the server devices 70 or 80, converts the received data from the DXF format to the JPG format or the BMP format, and transmits to the mobile terminal 50 the converted data or location information indicating where the converted data is located in the server device 90. The DXF format is an example of the fourth format.

[Operations of Recording System 100]

Operations of the recording system 100 will be described with reference to FIGS. 3 to 9B. An image recording process illustrated in FIG. 3 is a process for recording an image on a recording sheet. The recording process in FIG. 3 is performed by the CPU 61 in the mobile terminal 60 executing the control program 65. During the recording process, the CPU 61 in the mobile terminal 50 controls an input device selected from among the server devices 70 and 80 and an output device selected from among the multifunction devices 10A and 10B to cooperate with each other. More specifically, data is selected by a user of the mobile terminal 50 from among the data stored in the user's selected input device (server device 70 or 80). The selected data is converted into the first format in the mobile terminal 50 or the server device 90. A recording process is then performed by the multifunction device 10A or 10B on the converted first-format data. Incidentally, the input device is an example of the first device, and the output device is an example of the second device.

When the operation unit 54 of the mobile terminal 50 receives a user's tapping operation (or touching operation) on an image recording process button in a menu screen (not illustrated), the CPU 61 first performs a cooperative device ID listing process (S11). The cooperative device ID listing process is a process for allowing the user of the mobile terminal 50 to select a combination of the input device and the output device that are desired to cooperate with each other. Next, the cooperative device ID listing process will be described with reference to FIG. 4.

In S21, the CPU 61 acquires information on the first format that is compatible with the recording process performed by the printer units 11 of the multifunction devices 10A and 10B. In S22, the CPU 61 acquires information on the third format that can be converted into the first format through in-mobile conversion. In S23, the control program 65 acquires information on the fourth format that can be converted into the first format through in-server conversion. The formats whose information is acquired in steps S21 to S23 will be referred to as supported formats, hereinafter. In the embodiment, the supported formats are a JPG format, a BMP format, a PDF format, and a DXF format.

As described above, the recording system 100 in the embodiment complies with the JPG format (first and fifth formats), the BMP format (first and sixth formats), the PDF format (second and third formats), and the DXF format (second and fourth formats). Specifically, the JPG format is supported by the multifunction device 10A. That is, the JPG format is compatible with the recording process performed by the printer unit 11 of the multifunction device 10A. In other words, the multifunction device 10A can record images represented by data in the JPG format. The BMP format is supported by the multifunction device 10B. That is, the BMP format is compatible with the recording process performed by the printer unit 11 of the multifunction device 10B. In other words, the multifunction device 10B can record images represented by data in the BMP format. The PDF format is supported by the mobile device 50 (control program 65), i.e. the mobile device 50 (control program 65) can convert data from the PDF format to the BMP or JPG format. The DXF format is supported by the server device 90, i.e. the server device 90 can convert data from the DXF format to the BMP or JPG format.

More specifically in S21, the CPU 61 receives the format information representing the first format from the multifunction devices 10A and 10B through the communication unit 55. In S23, the CPU 61 receives the format information representing the fourth format from the server device 90 through the communication unit 55. Alternatively, the CPU 61 may receive the format information from each device through the communication unit 55 in the later-described registration process (refer to FIG. 5) and store the format information in the data storage area 62B. In such a case, in S21 and S23, the CPU 61 acquires information of the supported formats from the format information stored in the data storage area 62B.

Next, in S24, the CPU 61 determines whether the mobile terminal 50 is capable of communicating with the server device 90. For example, the CPU 61 uses a ping message. Namely, the CPU 61 transmits an "echo request" packet to the server device 90 through the communication unit 55. The CPU 61 determines that the mobile terminal 50 is able to communicate with the server device 90 when the CPU 61 receives an "echo reply" packet from the server device 90 through the communication unit 55. The CPU 61 determines that the mobile terminal 50 is not able to communicate with the server device 90 when the CPU 61 does not receive an "echo reply" packet from the server device 90 through the communication unit 55 within a predetermined time. Examples of the message that the CPU 61 transmits to the server device 90 is not limited to the ping message, but other arbitrary messages may be used.

As to another example, the CPU 61 determines that the mobile terminal 50 is not able to communicate with the server device 90 when the communication unit 55 is not connected to the Internet 101. For example, the CPU 61 determines that the communication unit 55 is not connected to the Internet 101 when the connection between the OS 64 of the mobile terminal 50 and the Wi-Fi or a mobile communication network (not illustrated) is being set to OFF. Alternatively, the CPU 61 may determine that the communication unit 55 is not connected to the Internet 101 when the communication unit 55 is connected to the access point 102A but the wireless LAN 102 is not connected to the Internet 101. It is noted that the method employed in S24 to determine whether the mobile terminal 50 is capable of communicating with the server device 90 is not limited to the above-described examples.

Figure 6A:
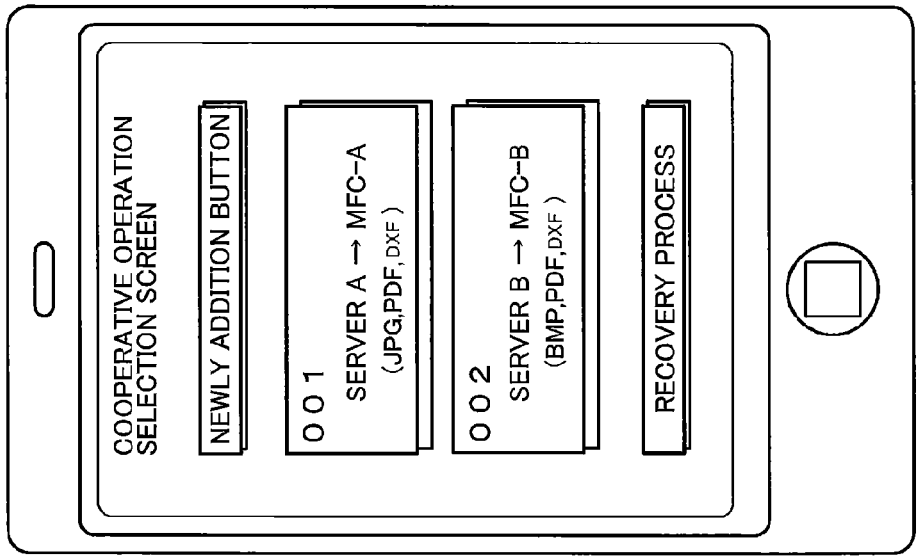
FIG. 6A illustrates a cooperative operation selection screen that is displayed on the mobile terminal when the mobile terminal is able to communicate with a server device.
Figure 6B:
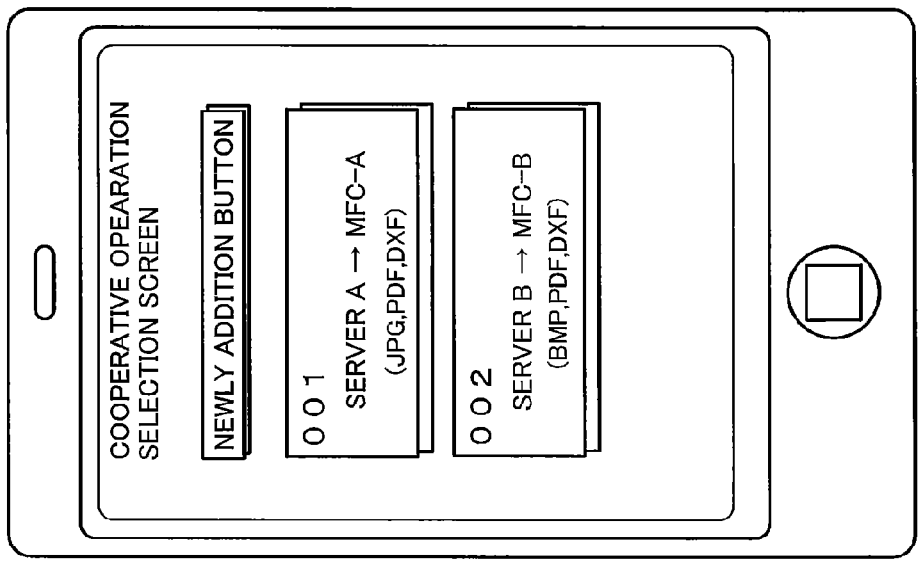
FIG. 6B illustrates the cooperative operation selection screen that is displayed on the mobile terminal when the mobile terminal is unable to communicate with the server device.

When determining that the mobile terminal 50 is able to communicate with the server device 90 (Yes in S24), the CPU 61 displays on the display unit 53 a cooperative operation selection screen as illustrated in FIG. 6A (S25). On the other hand, when determining that the mobile terminal 50 is not able to communicate with the server device 90 (No in S24), the CPU 61 displays on the display unit 53 the cooperative operation selection screen as illustrated in FIG. 6B (S26). The processes of steps S25 and S26 are examples of listing cooperative device identifiers.

The cooperative operation selection screen illustrated in FIG. 6A includes a newly addition button and one or more cooperative operation selection buttons. Each cooperative operation selection button indicates: a cooperative device ID identifying a combination of an input device and an output device; device names of the input device and the output device corresponding to the cooperative device ID; and data formats compatible with a recording process performed by the combination of the input device and the output device. The cooperative device ID is an example of the cooperative device identifier. The cooperative device ID, the device name of the input device, and the device name of the output device are correlated and stored in the data storage area 62B through a registration process, which will be described later with reference to FIG. 5.

In the state of FIG. 6A, the cooperative operation selection button with the cooperative device ID "001" indicates that a recording process can be performed on JPG-format data, PDF-format data, and DXF-format data by a combination of the server device 70 having a device name "server A" (input device) and the multifunction device 10A having a device name "MFC-A" (output device). The cooperative operation selection button with the cooperative device ID "002" indicates that a recording process can be performed on BMP-format data, PDF-format data, and DXF-format data by a combination of the server device 80 having a device name "server B" (input device) and the multifunction device 10B having a device name "MFC-B" (output device). Namely, each cooperative device selection button illustrated in FIG. 6A indicates that a recording process can be performed on first-format data, third-format data, and fourth-format data (DXF).

The cooperative operation selection screen illustrated in FIG. 6B is different from the cooperative operation selection screen illustrated in FIG. 6A in the following two points: first, among the data formats displayed on each cooperative operation selection button illustrated in FIG. 6B, the data format "DXF" is displayed in a different display form than the other data formats; second, the cooperative operation selection screen illustrated in FIG. 6B further includes a recovery process button. In this example, the data format "DXF" is displayed in a different display form the other data formats as follows: the character size of "DXF" is smaller than those of "PDF", "BMP" and "JPG"; and the character color of "DXF" is paler than those of "PDF", "BMP" and "JPG". However, the display form, which is designed in the different manner from that for the other formats, is not particularly limited to the specific example. For example, the font of "DXF" may be different from those of "PDF", "BMP" and "JPG".

In FIG. 6B, the cooperative operation selection button with the cooperative device ID "001" indicates that a recording process can be performed on JPG-format data and PDF-format data and a recording process cannot be performed on DXF-format data. The cooperative operation selection button with the cooperative device ID "002" indicates that a recording process can be performed on BMP-format data and PDF-format data, but cannot be performed on DXF-format data. Namely, each cooperative operation selection button illustrated in FIG. 6B indicates that a recording process can be performed on first-format and third-format data, but cannot be performed on fourth-format data. In the cooperative operation selection screen of FIG. 6B, the "DXF" may be displayed in other various display manners so that the "DXF" will be perceived by a user differently from the other data formats.

The recovery process button is a button requesting execution of a recovery process for recovering communication with the server device 90. The recovery process button is an example of a selection option. When the operation unit 54 receives the user's tapping operation on the recovery button (Yes in S27), the CPU 61 performs the recovery process (S28). For example, in the recovery process, the CPU 61 temporarily ends the connection between the communication unit 55 and the access point 102A and tries to establish the connection to the server device 90 again. Or the control program may try to connect the mobile terminal 50 to another server device (not illustrated) that can serve as a substitute of the server device 90.

Otherwise, in the recovery process, the CPU 61 may connect the communication unit 55 to an access point (not illustrated) different from the access point 102A. Alternatively, the CPU 61 may display, on the display unit 53, a list of access points to which the communication unit 55 can be connected so that the user can select an access point to which the user desires to have the communication unit 55 to connect. When connection of the OS 64 to the Wi-Fi or a mobile communication network (not illustrated) is being set to OFF, the CPU 61 may switch the setting of connection to ON, or may inform the user that the setting of connection should be switched to ON. However, the recovery process is not particularly limited to the above-described example.

When the connection of the mobile terminal 50 to the server device 90 is recovered by the recovery process (Yes in S24), the CPU 61 displays the cooperative device selection screen illustrated in FIG. 6A on the display unit 53 (S25). Otherwise, when connection of mobile terminal 50 to the server device 90 is not recovered even by performing the recovery process (No in S24), the CPU 61 displays the cooperative operation selection screen illustrated in FIG. 6B on the display unit 53 again (S26). For example, the CPU 61 can determine whether the connection of the mobile terminal 50 to the server device 90 is recovered through several methods, including: determining whether the setting of connection to the Wi-Fi or the mobile communication network (not illustrated) has been turned ON; determining whether the communication unit 55 has been connected to the access point 102A or another access point (not illustrated); and determining whether a reply message has been received in response to a ping message or another message transmitted to the server device 90.

Figure 7A:
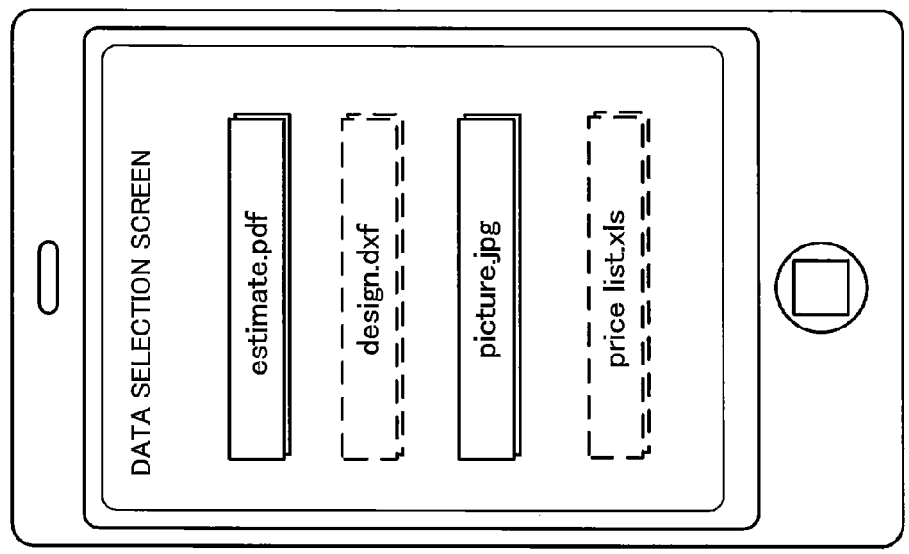
FIG. 7A illustrates a data selection screen that is displayed on the mobile terminal when the mobile terminal is able to communicate with the server device.
Figure 7B:
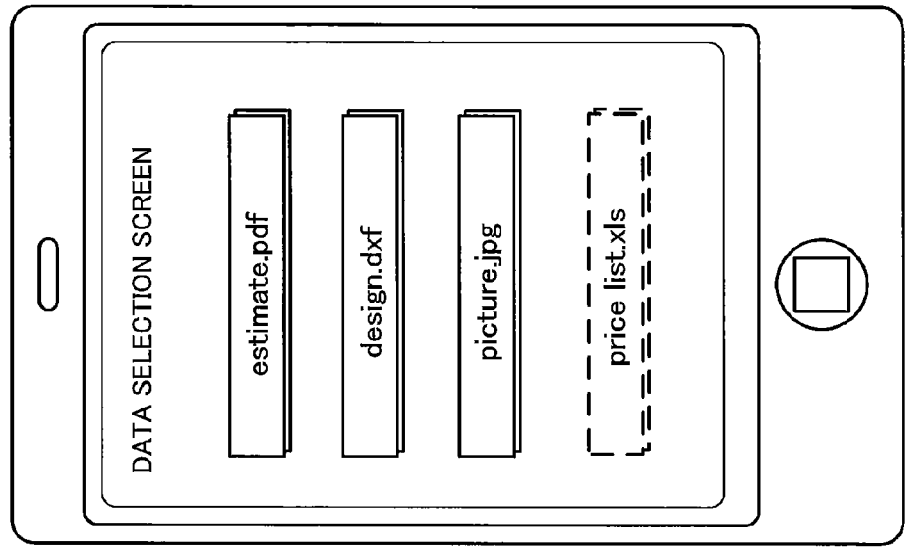
FIG. 7B illustrates the data selection screen that is displayed on the mobile terminal when the mobile terminal is unable to communicate with the server device.

Returning to FIG. 3, when the operation unit 54 receives the user's tapping (touch) operation on one of the cooperative operation selection buttons (Yes in S12), the CPU 61 displays a data selection screen on the display unit 53 (S13). FIG. 7A illustrates an example of the data selection screen that is displayed when the user taps on the cooperative operation selection button with the cooperative device ID "001" on the cooperative operation selection screen illustrated in FIG. 6A. FIG. 7B illustrates an example of the data selection screen which is displayed when the user taps on the cooperative operation selection button with the cooperative device ID "001" the cooperative operation selection screen illustrated in FIG. 6B. The step S13 is an example of listing the first identifier and the second identifier.

The data selection screen illustrated in each of FIGS. 7A and 7B includes one or more data selection buttons. The data selection buttons show data IDs identifying data stored in the server device 70 (server A). In S13, in order to display data selection screen, the CPU 61 receives from the server device 70 through the communication unit 55 data IDs to be displayed on the data selection button and location information of the data identified by the data ID. The location information indicates where data identified by the data ID is stored in the server device 70. Examples of the data ID include a file name. However, the data ID is not particularly limited to the specific example. The data ID is an example of the first identifier and the second identifier. In the data selection screen, the data selection buttons are displayed in different forms depending on whether the data selection buttons are selectable or non-selectable. Specifically as illustrated in FIGS. 7A and 7B, the selectable data selection buttons are designed as active buttons bordered by solid lines, and the non-selectable data selection buttons are designed as non-active buttons bordered by dashed lines. For example, the difference in display forms may be the same as that of the cooperative operation selection screen.

Specifically, in FIG. 7A, the data selection buttons for the file names "estimate.pdf", "design.dxf", and "picture.jpg" are selectable, and the data selection button for the file name "price list.xls" is non-selectable. Namely, in the data selection screen illustrated in FIG. 7A, the data selection button for data IDs of the first-format data, the third-format data, and the fourth-format data is selectable, and the data selection button for data IDs of other format data are non-selectable. Accordingly, the user can easily recognize which data is compatible with the recording process In FIG. 7B, the data selection buttons for the file names "estimate.pdf" and "picture.jpg" are selectable, and the data selection buttons for the file names "design.dxf" and "price list.xls" are non-selectable. Namely, in the data selection screen illustrated in FIG. 7B, the data selection buttons for data IDs of the first-format data and the third-format data is selectable, and the data selection button where data IDs of other format data are indicated is non-selectable.

Next, when the operation unit 54 receives the user's tapping operation on one of the data selection buttons (Yes in S14), the CPU 61 acquires from the server device 70 through the communication unit 55 data identified by the data ID on the data selection button (hereinafter, referred to as "selected data") (S15). In S15, the CPU 61 locates the user's selected data referring to the location information that has been received from the server device 70 in S13. That is, the CPU 61 specifies the location of the user's selected data.

If the selected data is formatted in the first format (Yes in S16), the CPU 61 transmits recording instruction information, including the selected data received in step S15, to the multifunction device 10A through the communication unit 55 (S20). Alternatively, in S20, the CPU 61 may transmit recording instruction information, including the location information of the selected data in the server device 70, to the multifunction device 10A through the communication unit 55. In this case, the process of step S15 is omitted. The recording instruction information instructs the multifunction device 10A to receive the selected data referring to the location information and perform the recording process on the selected data.

On the other hand, if the selected data is in the third format (No in S16 and Yes in S17), the CPU 61 converts the selected data from the third format to the first format through in-mobile conversion (S18). Therefore, in a case where, for example, "estimate.pdf" is selected on the data selection screen, the data is converted by the CPU 61 from the PDF format to the JPG format. Next, the CPU 61 transmits recording instruction information, including the selected data that has been converted into the first format in S18, to the multifunction device 10A through the communication unit 55 (S20).

If the selected data is in the fourth format (No in S16 and No in S17), the CPU 61 instructs the server device 90 to convert the selected data from the fourth format to the first format through in-server conversion (S19). Therefore, in a case where, for example, "design.dxf" is selected on the data selection screen, the data is converted by the server device 90 from the DXF format to the JPG format.

More specifically, in S19, the CPU 61 transmits conversion instruction information including fourth-format selected data through the communication unit 55 to the server device 90. The conversion instruction information is for instructing the server device 90 to receive the selected data and convert the selected data from the fourth format to the first format. Receiving the conversion instruction information, the server device 90 converts the selected data included in the conversion instruction information from the fourth format to the first format, and transmits the converted data back to the mobile terminal 50.

As another example, in S19, the CPU 61 may transmit conversion instruction information including location information of the fourth-format selected data through the communication unit 55 to the server device 90. In this case, the process of step S15 is omitted. Receiving the conversion instruction information, the server device 90 acquires from the server device 70 the selected data by using the location information, and converts the acquired data from the fourth format to the first format. Next, the server device 90 transmits the converted data to the mobile terminal 50. In place of transmitting the converted data itself to the mobile terminal 50, the server device 90 may transmit to the mobile terminal 50 location information indicating where the converted data is located in the server device 90.

When receiving the first-format converted data from the server device 90 through the communication unit 55, the CPU 61 transmits recording instruction information including the first-format converted data to the multifunction device 10 through the communication unit 55 (S20). When receiving the location information of the first-format converted data from the server device 90 through the communication unit 55, the CPU 61 transmits recording instruction information including the location information to the multifunction device 10 through the communication unit 55 (S20).

When receiving the recording instruction information including the first-format data from the mobile terminal 50 through the communication unit 25, the CPU 31 (control program 35) of the multifunction device 10A instructs the printer unit 11 to perform a recording process for recording an image represented by the first-format data on a recording sheet. When receiving recording instruction information including location information of the first-format data from the mobile terminal 50 through the communication unit 25, the CPU 31 (control program 35) employs the location information to receive the first-format data from the server device 70 or 90 through the communication unit 25, and instructs the printer unit 11 to perform a recording process for recording an image represented by the selected first-format data on a recording sheet.

[Registration Process]

Next will be described the registration process with referred to FIG. 5. The registration process is performed for allowing the user of the mobile terminal 50 to newly select his/her desired combination of an input device and an output device and storing the device names of the selected input and output devices and a cooperative device ID for the newly selected combination in the data storage area 62B. For example, when the operation unit 54 recognizes a user's tapping operation on the newly addition button on the cooperative operation selection screen (FIGS. 6A and 6B), the CPU 61 of the mobile terminal 50 performs the registration process as illustrated in FIG. 5.

Figure 8B:
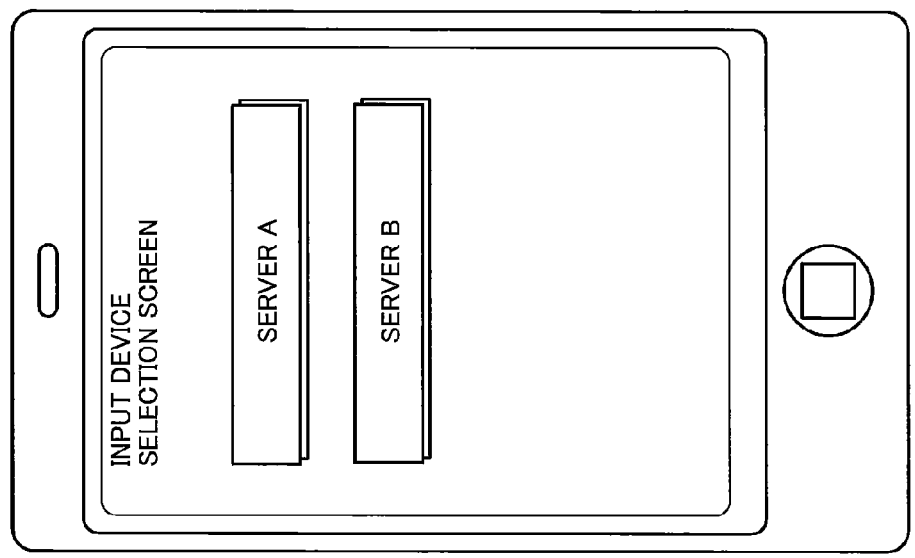
FIG. 8B illustrates an input device selection screen.
Figure 8A:
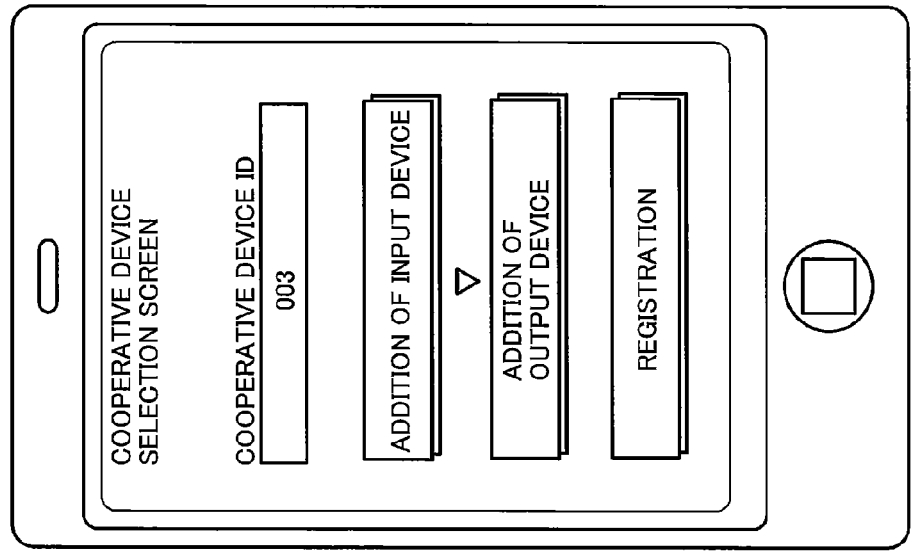
FIG. 8A illustrates a cooperative device selection screen displayed on the mobile terminal in a case where input and output devices have not been selected.

First, the CPU 61 displays a cooperative device selection screen on the display unit 53 (S31). FIG. 8A illustrates an example of the cooperative device selection screen. The cooperative device selection screen illustrated in FIG. 8A includes a text box where a cooperative device ID is to be inputted, a "+ addition of input device" button, a "+ addition of output device" button, and a registration button. The cooperative device ID may be automatically allocated by the CPU 61, and the cooperative device ID that is allocated by the control program 65 can be changed by the user.

When the operation unit 54 receives the user's tapping operation on the "+ addition of input device" button (S32: addition of input device), the CPU 61 displays an input device selection screen on the display unit 53 (S33). FIG. 8B illustrates an example of the input device selection screen. The input device selection screen illustrated in FIG. 8B includes one or more input device selection buttons. Among plural devices that are capable of communicating with the communication unit 55, device names of devices that can serve as input devices are listed as candidates for input devices on the input device selection buttons. The candidate for the input device is one of the server devices 70 and 80 that are able to communicate with the communication unit 55 and store data in a variety of different formats. The process of step S33 is an example of displaying a list of the storing-device identifier.

Figure 9A:
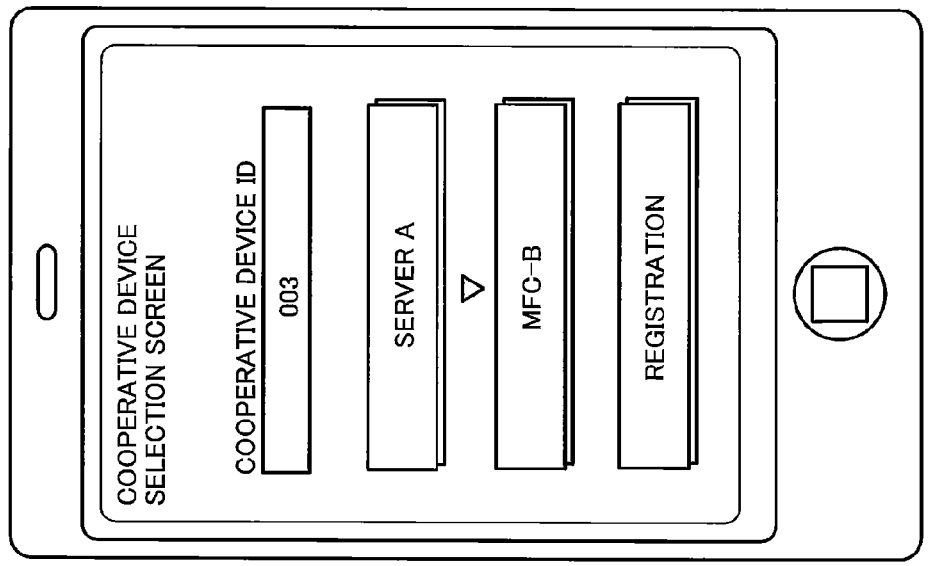
FIG. 9A illustrates an output device selection screen.
Figure 9B:
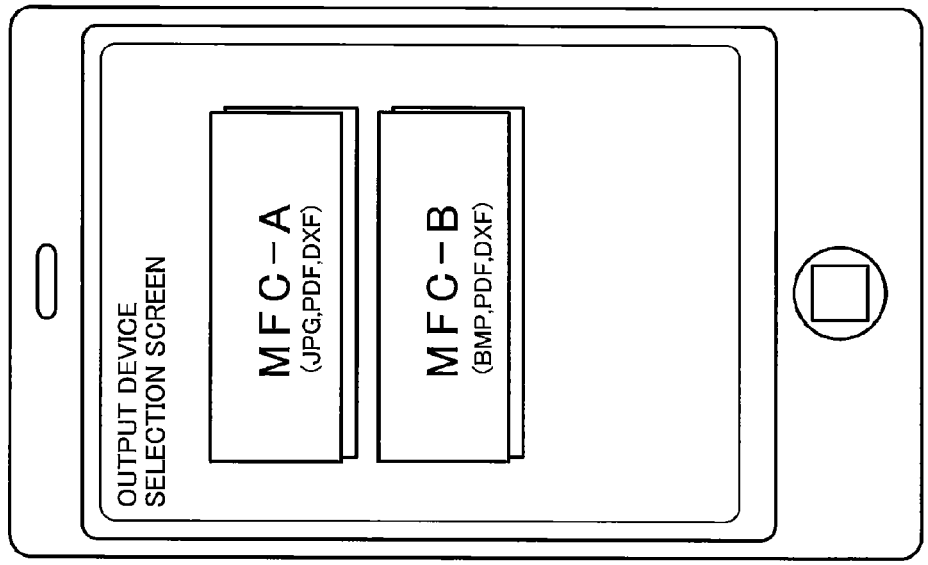
FIG. 9B illustrates the cooperative device selection screen displayed on the mobile terminal in a case where input and output devices have been selected.

Next, when the operation unit 54 recognizes the user's tapping operation on some input device selection button (Yes in S34), the CPU 61 stores in the data storage area 62B the device name indicated on the input device selection button (S35), and displays the cooperative device selection screen on the display unit 53 again (S31). As illustrated in FIG. 9B, after the input device is selected, the cooperative device selection screen includes a button where the device name of the selected input device is displayed instead of "+ addition of input device" button. In the embodiment, the following operations are based on the case where the "server A" is selected as an input device.

When the operation unit 54 recognizes the user's tapping operation on the "+ addition of output device" button (S32: addition of output device), the CPU 61 displays an output device selection screen on the display unit 53 (S36). FIG. 9A illustrates an example of the output device selection screen. The output device selection screen illustrated in FIG. 9A includes one or more output device selection buttons. Among the plural devices which are able to communicate with the communication unit 55, device names of those devices that can serve as output devices are listed as candidates for the output device on the output device selection buttons. The candidate for the output device is one of the multifunction devices 10 that are able to communicate with the communication unit 55 and that can record image represented by data in the first format. The process of step S36 is an example of display a list of the recording-device identifiers.

Each output device selection button indicates not only the device name of an output device candidate, but also the data formats that are compatible with a recording process on the output device candidate. In FIG. 9A, the JPG format, the PDF format, and the DXF format are displayed on the output device selection button for the device name "MFC-A". The BMP format, the PDF format, and the DXF format are displayed on the output device selection button for the device name "MPC-B". Namely, the output device selection button for each output device candidate indicates that the output device candidate can perform a recording process on the second-format data, and the fifth-format data or the sixth-format data.

When the operation unit 54 receives the user's tapping operation on some output device selection button (Yes in S37), the CPU 61 stores the device name indicated on the output device selection button in the data storage area 62B (S38), and displays the cooperative device selection screen on the display unit 53 again (S31). As illustrated in FIG. 9B, after the output device is selected, the cooperative device selection screen displays a button where the name of the selected output device is displayed instead of the "+ addition of output device" button. In the embodiment, the following operations will be described on the basis of a case where the "MFC-B" is selected.

When the operation unit 54 recognizes the user's tapping operation on the registration button (S32: registration button), the CPU 61 registers and stores, in the data storage area 62B, the device name of the input device stored in S35, the device name of the output device stored in S38, and the cooperative device ID displayed on the cooperative device selection screen (S39) in correlation with one another. Next, the CPU 61 ends the registration process. Namely, in the embodiment, the cooperative device ID "003", the device name "server A" for the input device, and the device name "MFC-B" for the output device are newly stored in the data storage area 62B in correlation with one another. Incidentally, the registration button may be configured not to be selectable until both of the input device and the output device are selected.

Advantages of Embodiment

According to the above-described embodiment, the second-format selected data is converted into the first format, and after that, the multifunction device 10A performs the recording process on the first-format selected data. Accordingly, data in many types of formats can be made compatible with the recording process performed by the multifunction device 10A. In addition, because the conversion process can be performed in the server device 90 as well as the mobile terminal 50, data in more types of formats can be made compatible with the recording process performed by the multifunction device 10A. Moreover, even when the mobile terminal 50 cannot access the server device 90, the communication can be recovered by performing the recovery process. After the recovery of the communication is performed, data in much more types of formats is made compatible with the recording process performed by the multifunction device 10A.

In addition, according to the above-described embodiment, in the data selection screen, only data IDs corresponding to the formats compatible with the recording process are displayed in a selectable manner. As a result, a user can easily recognize data on which a recording process can be performed. Moreover, in the cooperative operation selection screen and the data selection screen, the data formats compatible with the recording process and data formats incompatible with the recording process due to unavailability of the server device 90 are displayed in manners different from data formats compatible with the recording process. As a result, a user can easily recognize data formats on which a recording process can be performed.

The displaying form of the data selection buttons in the data selection screen is not limited to the examples of FIGS. 7A and 7B. For example, only the data selection buttons indicating data IDs of the first-format data and the second-format data may be displayed in the data selection screen. In this case, the data selection button indicating the file name "price list.xls" is omitted from the data selection screen illustrated in FIG. 7A. In addition, the data selection buttons indicating file names "design.dxf" and "price list.xls" are omitted from the data selection screen illustrated in FIG. 7B. Data formats may be displayed similarly on the cooperative operation selection screen. That is, the indication of "DXF" may be omitted from the cooperative operation selection screen illustrated in FIG. 6B.

According to the above-described embodiment, in a case where the fourth-format selected data is transmitted from the server device 70 to the server device 90, the server device 90 converts the selected data to the first format. After that, the server device 90 may transmit the converted data directly to the multifunction device 10A. As a result, in comparison with a case where the mobile terminal 50 relays the selected data between the server devices 70 and 90 and the multifunction device 10A, the load on the communication network can be reduced, and the processing time of the image recording process can be decreased.

Through the registration process, a user's desired combination of an input device and an output device can be generated. On the output device selection screen of FIG. 9A, data formats compatible with a recording process are indicated on each output device selection button. Accordingly, a user can easily select an output device that can perform a recording process on data in his/her desired format.

In addition, in the multifunction device 10 and the mobile terminal 50, the CPU 31 executes various programs stored in the program storage area 32A in the storage unit 32, and the CPU 61 executes various programs stored in the program storage area 62A of the storage unit 62. However, hardware components such as ICs (integrated circuits) may be used to execute at least part of the processes that are executed by the CPUs in the embodiment.

The present invention may be realized by a program. The program may be provided in a manner where the program is stored in a non-transitory recording medium and controlling the multifunction devices 10 and the mobile terminal 50 to perform processes. Examples of the non-transitory recording medium include: a CD-ROM; a DVD-ROM; and a storage unit installed in a server device that can be connected to the multifunction devices 10 and the mobile terminal 50 via a communication network. The program may be transmitted from the storage unit in the server device as information or signals representing the program via the communication network such as the Internet 101.

While the description has been made in detail with reference to specific embodiments thereof, it would be apparent to those skilled in the art that various changes and modifications may be made therein without departing from the spirit and scope of the above described embodiments.

What is claimed is:

1. A non-transitory computer readable storage medium storing program instructions executable by an information processing device, the information processing device including: a display unit configured to display information; an operation unit configured to receive a user's operation; and a communication unit configured to communicate with a plurality of devices and a server device, the plurality of devices including a first device and a second device, the first device being configured to store data in a plurality of different formats including a first format and a second format, the second format being classified into a third format and a fourth format, the third and fourth formats each being convertible to the first format, the second device being configured to record an image indicated by data in the first format on a recording medium, the program instructions, when executed by a processor of the information processing device, causing the information processing device to perform:
when the operation unit receives a user's operation selecting a combination of the first device and the second device, a data listing including:
when the communication unit of the information processing device is able to communicate with the server device, a display of a list of first identifiers and second identifiers on the display unit in a manner selectable through the operation unit, the first identifiers identifying data stored in the first device in the first format, the second identifiers identifying data stored in the first device in the second format, the second identifiers including third identifiers identifying data stored in the first device in the third format and fourth identifiers identifying data stored in the first device in the fourth format; and
when the communication unit of the information processing device is not able to communicate with the server device, a display of a list of the first identifiers and the third identifiers, without the fourth identifiers, on the display unit in a manner selectable through the operation unit;
transmitting a first recording instruction information to the second device via the communication unit when the operation unit receives a user's operation selecting one of the first identifiers, the first recording instruction information instructing the second device to receive data in the first format identified by the selected first identifier and to record an image indicated by the received data;
when the operation unit receives a user's operation selecting one of the third identifiers:
converting data identified by the selected one of the third identifiers from the third format to the first format, thereby obtaining first format-converted data; and
transmitting a second recording instruction information to the second device via the communication unit, the second recording instruction information instructing the second device to record an image indicated by the first format-converted data; and
when the operation unit receives a user's operation selecting one of the fourth identifiers:
transmitting conversion instruction information to the server device via the communication unit, the conversion instruction information instructing the server device to receive data identified by the selected one of the fourth identifiers and convert the received data identified by the selected one of the fourth identifiers from the fourth format to the first format, thereby obtaining second format-converted data; and
transmitting a third recording instruction information to the second device via the communication unit, the third recording instruction information instructing the second device to record an image indicated by the second format-converted data.

2. The non-transitory computer readable storage medium according to claim 1, wherein, when the operation unit receives the user's operation selecting one fourth identifier, the third recording instruction information includes location information indicating where the second format-converted data is located in the server device, the third recording instruction information instructing the second device to receive the second format-converted data referring to the location information and record an image indicated by the received data.

3. The non-transitory computer readable storage medium according to claim 1, wherein the data listing comprises displaying the list of the first identifiers and the second identifiers, without displaying identifiers identifying data in formats other than the first and second formats stored in the first device.

4. The non-transitory computer readable storage medium according to claim 1, wherein the conversion instruction information includes the data identified by the selected fourth identifier.

5. A non-transitory computer readable storage medium storing program instructions executable by an information processing device, the information processing device including: a display unit configured to display information; an operation unit configured to receive a user's operation; and a communication unit configured to communicate with a plurality of devices and a server device, wherein the plurality of devices include at least one first device and at least one second device, each first device being one of a plurality of storing devices and configured to store data in a plurality of different formats including a first format and a second format, the second format being classified into a third format and a fourth format, the third and fourth formats each being convertible to the first format, each second device being one of a plurality of recording devices configured to record an image indicated by data in the first format on a recording medium, wherein the information processing device further comprises a storage unit configured to store a plurality of different cooperative device identifiers identifying a plurality of different device combinations, each device combination including a respective first device and a respective second device;
wherein the program instructions, when executed by a processor of the information processing device, cause the information processing device to perform:
a cooperative device listing wherein:
when the communication unit is able to communicate with the server device, the cooperative device listing indicates that each device combination is able to perform a recording process on data in the first format, data in the third format, and data in the fourth format;
when the communication unit is unable to communicate with the server device, the cooperative device listing indicates that each device combination is able to perform a recording process on data in the first format and data in the third format and is unable to perform a recording process on data in the fourth format;

when the operation unit receives a user's operation selecting one cooperative device identifier identifying one device combination of a first device and a second device, the data listing displays a list including first identifiers and second identifiers, the first and second identifiers identifying data in the first and second formats, respectively, stored in the first device of the device combination identified by the selected cooperative device identifier, the second identifiers including third identifiers identifying data in the third format and fourth identifiers identifying data in the fourth format;

transmitting a first recording instruction information to the second device via the communication unit when the operation unit receives a user's operation selecting one of the first identifiers, the first recording instruction information instructing the second device to receive data in the first format identified by the selected first identifier and record an image indicated by the received data;

when the operation unit receives a user's operation selecting one of the third identifiers:
converting data identified by the selected one of the third identifiers from the third format to the first format, thereby obtaining first format-converted data; and
transmitting a second recording instruction information to the second device via the communication unit, the second recording instruction information instructing the second device to record an image indicated by the first format-converted data; and when the operation unit receives a user's operation selecting one of the fourth identifiers:
transmitting conversion instruction information to the server device via the communication unit, the conversion instruction information instructing the server device to receive data identified by the selected one of the fourth identifiers and convert the received data identified by the selected one of the fourth identifiers from the fourth format to the first format, thereby obtaining second format-converted data; and
transmitting a third recording instruction information to the second device via the communication unit, the third recording instruction information instructing the second device to record an image indicated by the second format-converted data.

6. The non-transitory computer readable storage medium according to claim 5, wherein, when the communication unit is unable to communicate with the server device, the cooperative device listing displays, on the display unit, a recovering option for recovering a communication with the server device; and
wherein the program instructions, when executed by the information processing device, causes the information processing device to recover the communication with the server device when the operation unit receives a user's operation selecting the recovering option.

7. The non-transitory computer readable storage medium according to claim 5, wherein the program instructions, when executed by the information processing device, causes the information processing device to further perform:
a storing-device listing to display, on the display unit, a list of storing-device identifiers identifying, as first-device candidates, candidates for a first device constituting a new device combination, each first-device candidate being one of the plurality of devices that are able to communicate with the communication unit and configured to store data in a plurality of different formats;
a recording-device listing to display, on the display unit, a list of recording-device identifiers identifying, as second-device candidates, candidates for a second device constituting the new device combination, each second-device candidate being one of the plurality of devices that are able to communicate with the communication unit and being configured to record an image indicated by the first format on a recording medium; and
when the operation unit receives a user's operation selecting one storing-device identifier and one recording-device identifier, newly adding the selected storing-device identifier, the selected recording-device identifier, and a new cooperative device identifier in the storage unit in correlation thereamong, the selected storing-device identifier and the selected recording-device identifier indicating a newly-added device combination of a first device and a second device.

8. The non-transitory computer readable storage medium according to claim 7, wherein the first format is classified into a fifth format and a sixth format;
wherein the recording-device listing indicates on the display unit, together with a recording-device identifier identifying a second-device candidate that can record an image indicated by data in the fifth format, that the second-device candidate can record images indicated by data in the second format and data in the fifth format; and
wherein the recording-device listing indicates on the display unit, together with a recording-device identifier identifying a second-device candidate that can record an image indicated by data in the sixth format, that the second-device candidate can record images indicated by data in the second format and data in the sixth format.

9. A recording system comprising an information processing device and a plurality of devices, the plurality of devices including a first device and a second device, the first device being configured to store data in a plurality of different formats including data in a first format and data in a second format that is convertible to the first format, the second format being classified into a third format and a fourth format, the second device being configured to record an image indicated by data in the first format on a recording medium,
the information processing device including:
a display unit configured to display information;
an operation unit configured to receive a user's operation;
a communication unit configured to communicate with the plurality of devices and a server device; and
a control unit configured to:
when the operation unit receives a user's operation selecting a combination of the first device and the second device, a data listing including:
when the communication unit of the information processing device is able to communicate with the server device, a display of a list of first identifiers and second identifiers on the display unit in a manner selectable through the operation unit the first identifiers identifying data stored in the first device in the first format, the second identifiers identifying data stored in the first device in the second format, the second identifiers including third identifiers identifying data stored in the first device in the third format and fourth identifiers identifying data stored in the first device in the fourth format; and when the communication unit of the information processing device is not able to communicate with the server device, a display of a list of the first identifiers and the third identifiers, without the fourth identifiers, on the display unit in a manner selectable through the operation unit;

transmit a first recording instruction information to the second device via the communication unit when the operation unit receives a user's operation selecting one first identifier, the first recording instruction information instructing the second device to receive data in the first format identified by the selected first identifier and record an image indicated by the received data;

when the operation unit receives a user's operation selecting one of the third identifiers:
converting data identified by the selected one of the third identifiers from the third format to the first format, thereby obtaining first format-converted data; and
transmit a second recording instruction information to the second device via the communication unit, the second recording instruction information instructing the second device to record an image indicated by the first format-converted data; and when the operation unit receives a user's operation selecting one of the fourth identifiers:
transmitting conversion instruction information to the server device via the communication unit, the conversion instruction information instructing the server device to receive data identified by the selected one of the fourth identifiers and convert the received data identified by the selected one of the fourth identifiers from the fourth format to the first format, thereby obtaining second format-converted data; and
transmitting a third recording instruction information to the second device via the communication unit, the third recording instruction information instructing the second device to record an image indicated by the second format-converted data.

10. The recording system according to claim 9, wherein, when the operation unit receives the user's operation selecting one fourth identifier, the third recording instruction information includes location information indicating where the second format-converted data is located in the server device, the third recording instruction information instructing the second device to receive the second format-converted data referring to the location information and record an image indicated by the received data.

11. The recording system according to claim 9, wherein the data listing comprises displaying the list of the first identifiers and the second identifiers, without displaying identifiers identifying data in formats other than the first and second formats stored in the first device.

12. The recording system according to claim 9, wherein the conversion instruction information includes the data identified by the selected fourth identifier.

13. A recording system comprising an information processing device and a plurality of devices, the plurality of devices including at least one first device and at least one second device, each first device being one of a plurality of storing devices and configured to store data in a plurality of different formats including data in a first format and data in a second format that is convertible to the first format, the second format being classified into a third format and a fourth format, each second device being one of a plurality of recording devices and configured to record an image indicated by data in the first format on a recording medium, the information processing device including:
a display unit configured to display information;
an operation unit configured to receive a user's operation;
a communication unit configured to communicate with the plurality of devices and a server device;
a storage unit configured to store a plurality of different cooperative device identifiers identifying a plurality of different device combinations, each device combination including a first device and a second device; and
a control unit configured to:
perform a cooperative device listing to display a list of cooperative device identifiers on the display unit, wherein:
when the communication unit is able to communicate with the server device, the cooperative device listing indicates that each device combination is able to perform a recording process on data in the first format, data in the third format, and data in the fourth format;
when the communication unit is unable to communicate with the server device, the cooperative device listing indicates that each device combination is able to perform a recording process on data in the first format and data in the third format and is unable to perform a recording process on data in the fourth format;
when the operation unit receives a user's operation selecting one cooperative device identifier identifying one device combination of a first device and a second device, the data listing displays a list of first and second data identifiers identifying data in the first and second formats, respectively, stored in the first device in the device combination identified by the selected cooperative device identifier, the second identifiers including third identifiers identifying data stored in the first device in the third format and fourth identifiers identifying data stored in the first device in the fourth format;
transmit a first recording instruction information to the second device via the communication unit when the operation unit receives a user's operation selecting one first identifier, the first recording instruction information instructing the second device to receive data in the first format identified by the selected first identifier and record an image indicated by the received data;
when the operation unit receives a user's operation selecting one of the third identifiers:
converting data identified by the selected one of the third identifiers from the third format to the first format, thereby obtaining first format-converted data;
transmit a second recording instruction information to the second device via the communication unit, the second recording instruction information instructing the second device to record an image indicated by the first format-converted data; and when the operation unit receives a user's operation selecting one of the fourth identifiers:
- transmitting conversion instruction information to the server device via the communication unit, the conversion instruction information instructing the server device to receive data identified by the selected one of the fourth identifiers and convert the received data identified by the selected one of the fourth identifiers from the fourth format to the first format, thereby obtaining second format-converted data; and
- transmitting a third recording instruction information to the second device via the communication unit, the third recording instruction information instructing the second device to record an image indicated by the second format-converted data.

14. The recording system according to claim 13, wherein, when the communication unit is unable to communicate with the server device, the cooperative device listing displays, on the display unit, a recovering option for recovering a communication with the server device; and
wherein the control unit is further configured to recover the communication with the server device when the operation unit receives a user's operation selecting the recovering option.

15. The recording system according to claim 13, wherein the control unit is further configured to perform:
- a storing-device listing to display, on the display unit, a list of storing-device identifiers identifying, as first-device candidates, candidates for a first device constituting a new device combination, each first-device candidate being one of the plurality of devices that are able to communicate with the communication unit and configured to store data in a plurality of different formats;
- a recording-device listing to display, on the display unit, a list of recording-device identifiers identifying, as second-device candidates, candidates for a second device constituting the new device combination, each second-device candidate being one of the plurality of devices that are able to communicate with the communication unit and being configured to record an image indicated by the first format on a recording medium; and
- when the operation unit receives a user's operation selecting one storing-device identifier and one recording-device identifier, newly adding the selected storing-device identifier, the selected recording-device identifier, and a new cooperative device identifier in the storage unit in correlation thereamong, the selected storing-device identifier and the selected recording-device identifier indicating a newly-added device combination of a first device and a second device.

16. The recording system according to claim 15, wherein the first format is classified into a fifth format and a sixth format;
wherein the recording-device listing indicates on the display unit, together with a recording-device identifier identifying a second-device candidate that can record an image indicated by data in the fifth format, that the second-device candidate can record images indicated by data in the second format and data in the fifth format; and
wherein the recording-device listing indicates on the display unit, together with a recording-device identifier identifying a second-device candidate that can record an image indicated by data in the sixth format, that the second-device candidate can record images indicated by data in the second format and data in the sixth format.

* * * * *